March 17, 1936. R. KREMER ET AL 2,034,240
ENGRAVING OR PATTERN REPRODUCING MECHANISM
Filed March 22, 1934  3 Sheets-Sheet 1

INVENTORS
Robert Kremer
Robert Cummins

March 17, 1936.  R. KREMER ET AL  2,034,240
ENGRAVING OR PATTERN REPRODUCING MECHANISM
Filed March 22, 1934  3 Sheets-Sheet 3
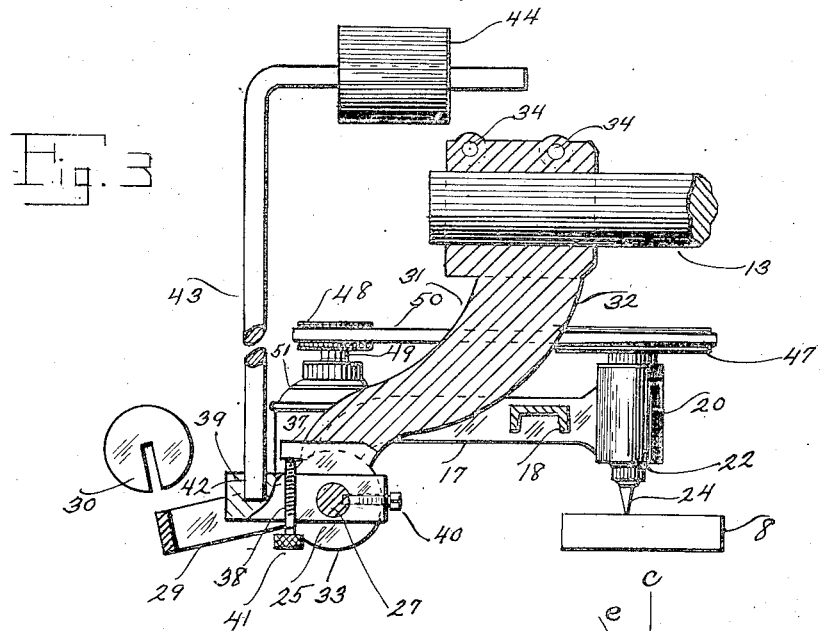
Fig. 3
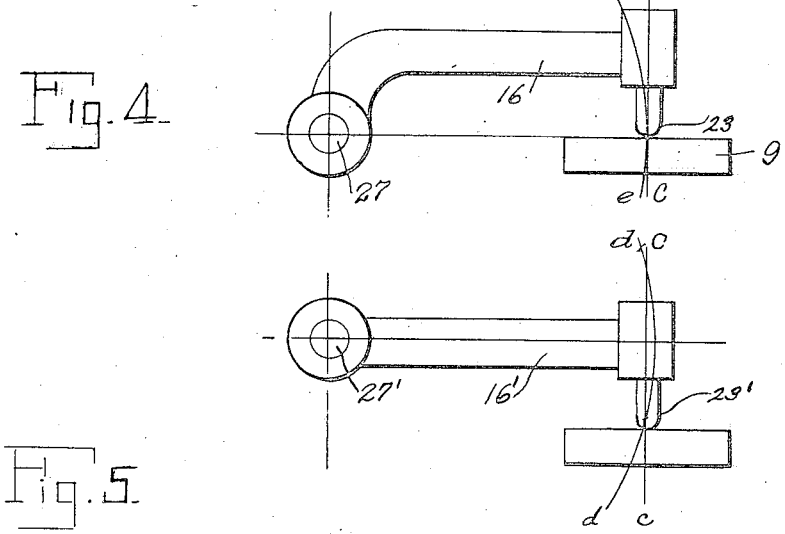
Fig. 4
Fig. 5
INVENTORS
Robert Kremer
Robert Cummins Patented Mar. 17, 1936

2,034,240

UNITED STATES PATENT OFFICE 2,034,240

ENGRAVING OR PATTERN REPRODUCING MECHANISM

Robert Kremer and Robert Cummins, Cleveland, Ohio

Application March 22, 1934, Serial No. 716,816

5 Claims. (Cl. 90—13.2)

This invention relates to improvements in profiling or engraving machines and has for its principal object the construction of a machine of this character which may be simply and inexpensively built and operated and which will function satisfactorily to perform delicate duplicating operations whereby irregularly shaped surfaces may be readily transcribed from a templet, a master pattern, or a model and accurately reproduced.

It is a feature of the invention that the machine described herein may be constructed as an attachment for various types of conventional machine tool structures and is particularly adapted for use as an accessory to machine tools having horizontally displaceable work supports, for example, milling machines, or the like.

It is a further object of the invention to provide a machine of this character which is enabled to follow with greater accuracy the contour of a pattern to be reproduced as the result of an improved relationship of the moving parts of the machine, whereby the members which directly engage the pattern and the work are movable during operation more nearly in a direction normal to the general plane of the pattern and work than is possible with machines heretofore constructed.

A further object of the invention is the provision in a machine of this character of a driving means for the usual cutting tool which is so connected to the tool that on displacement of the latter in response to variation in the contour of the pattern, the driving connection remains unaffected. In the preferred form of the invention the tool is driven by a motor which is supported for movement with the tool support and which is so disposed as to contribute to the accuracy of balance of the moving parts which is essential for delicate operation.

Further objects and features of the invention will be apparent from the following description, taken in connection with the accompanying drawings, in which Figure 1 is a side elevation of a machine illustrating one embodiment of the invention, the machine being shown as constructed for attachment to a conventional type of milling machine;

Figure 3 is a fragmentary sectional view taken substantially on the line A—A of Figure 2; and Figures 4 and 5 are diagrammatic views of the supporting member for a cutting or tracing tool, illustrating the improvement in operation resulting from the construction herein described.

For convenience in describing the invention, reference is made to the single embodiment thereof which is illustrated in the accompanying drawings, specific language being used. It will nevertheless be understood that no limitation of the invention is thereby intended and that various alterations and further modifications of the illustrated structure are contemplated.

Figure 1:
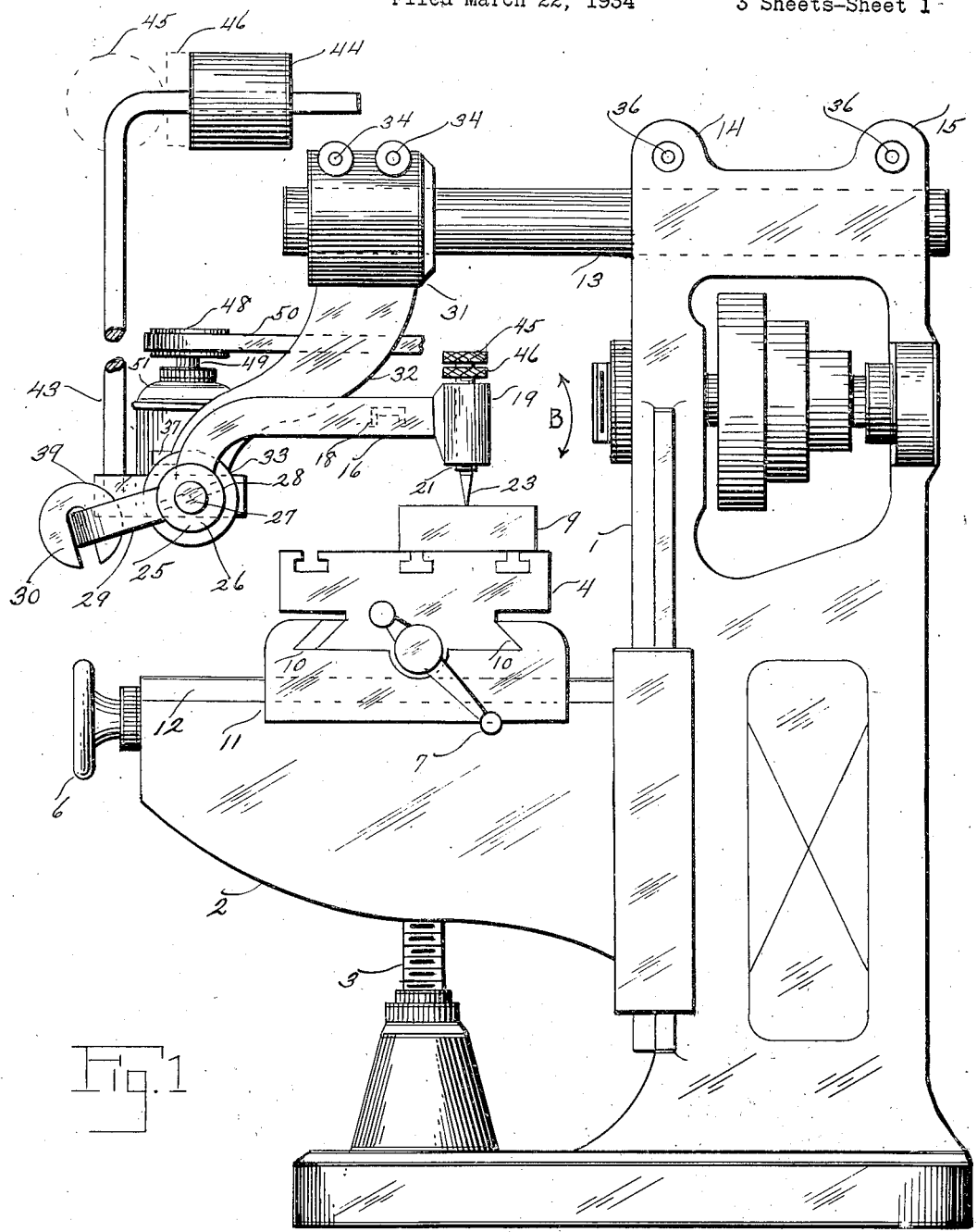
Figure 2:
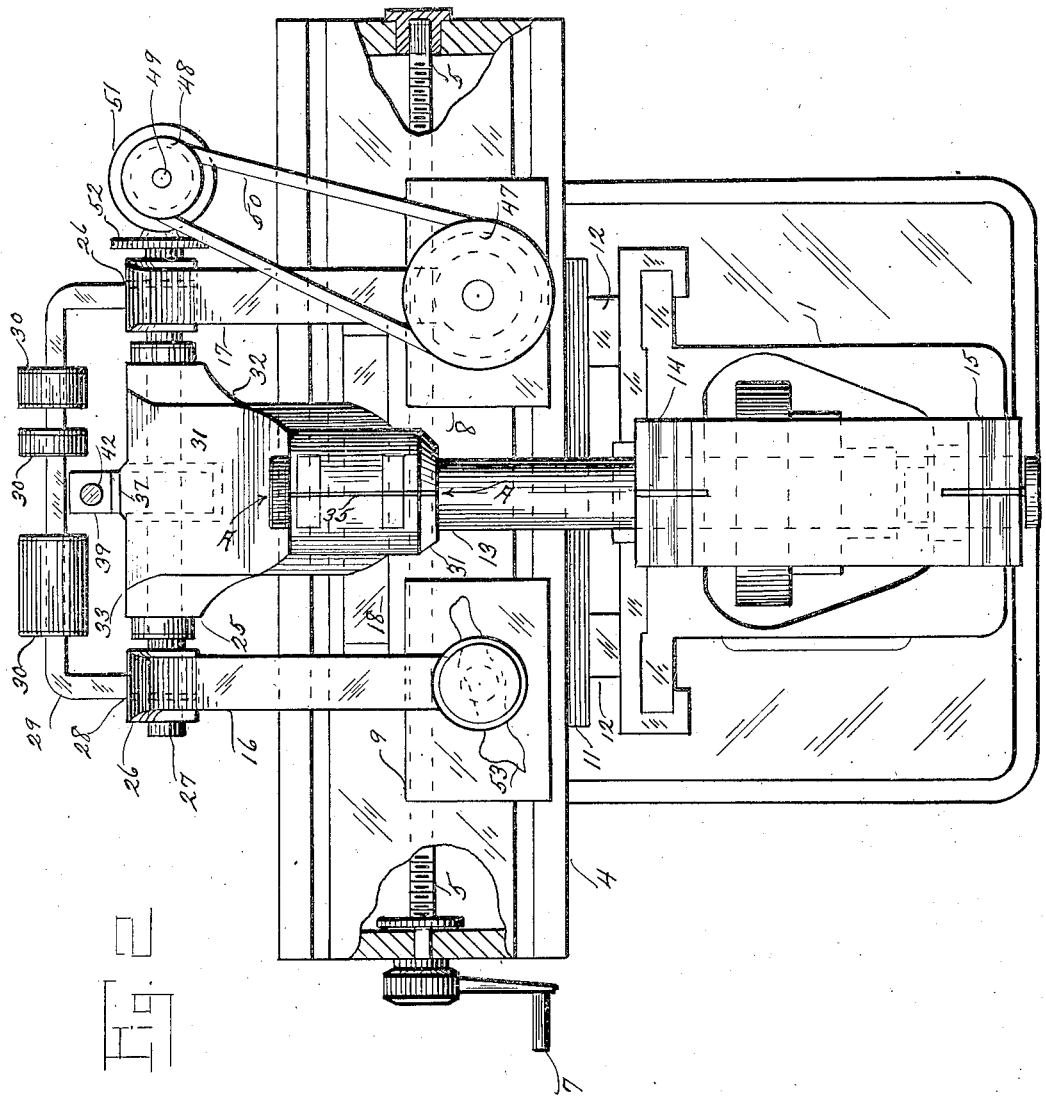
Figure 2 is a plan view of the structure shown in Figure 1.

Referring first to Figures 1 to 3 of the drawings, in which the invention is shown as applied to a milling machine, it will be observed that the reference character 1 indicates the standard portion of the milling machine with which is associated a common type of vertically reciprocable knee 2, the latter being displaceable vertically by the threaded element 3 which is in turn carried on the base of the machine. The knee 2 is provided with a table 4 which extends transversely thereof and which is supported for longitudinal and transverse reciprocal movement thereon. For instance, the table 4 may be slidably mounted in a transverse carriage 11 by means of dovetailed tracks or ways 10, the latter extending longitudinally of the milling machine. The transverse carriage 11 may be in turn supported for reciprocating movement in similar dovetailed ways 12 which extend transversely of the machine. The longitudinal adjustment of the table 4 may be effected by rotation of a handle 7 which is operatively connected to the table by means of a screw 5, while the transverse movement of the carriage 11 may be effected by rotation of a hand wheel 6 which is likewise connected with the carriage through suitable screw and nut gearing. This arrangement is conventional and permits displacement of the table 4 in any direction in a generally horizontal plane.

The standard portion 1 of the milling machine carries at its upper end a generally horizontally disposed steady bar 13, the bar being secured in position in a clamping device which is adjusted by means of bolts passing through the apertures 36 in lugs 14 and 15. Use is preferably made of the steady bar 13 as a support for the working elements of the reproducing device, it being understood that the structure thus far described is wholly conventional and that the details thereof form no essential part of the present invention except in their relation to the elements hereinafter described.

Thus the reproducing device may be supported wholly on an arm 32 having at its upper end a split boss 31 which is adapted to be clamped at 34 by means of suitable bolts to the steady arm 13. At its lower end the arm 32 is provided with a second boss 33 in which a shaft 27 is journalled for free rotation about a substantially horizontal axis.

Secured to the shaft 27 are a pair of arms 16 and 17 which may be located at either side of the supporting arm 32. At its outer end the arm 16 may be provided with a boss 19 in which is received a generally vertically disposed tracing element 23. For convenience, the tracing element 23 may be carried within a holder 21 which is in turn threaded in the boss 19 and which is adjustable within the boss by rotation of a knurled element 45, a knurled lock nut 46 being threaded on the holder 21 to lock the latter in adjusted position.

The arm 17 is similarly arranged to carry a cutter 24, the spindle 22 of the cutter being supported for rotation within a boss 20 formed on the outer end of arm 17. At its upper end the cutter spindle carries a pulley 47 by means of which the cutter may be rotated on the axis thereof.

We prefer to drive the pulley 47 and thereby the cutter 24 by means of a separate motor 51 which is carried on a motor support 52, the latter being secured to one end of the shaft 27, preferably by the employment of some means which will permit rotative adjustment of the support and motor about the axis of the shaft. A pulley 48 on the upper end of the motor shaft 49 is geared by means of a belt 50 to the pulley 47 on the cutter spindle, this belt being tightened to the necessary extent by rotative adjustment of the motor support 52 on the shaft 27.

From the construction thus far described the general mode of operation of the device will be apparent. Thus a pattern 9 having an upper surface 53 of irregular contour and a work blank 8 on which this pattern is to be reproduced are both secured rigidly on the upper surface of the work table 4. The work table is then traversed in longitudinal and transverse directions by manipulation of the handle 7 and hand wheel 6 and the tracer element 23 will thus be caused to follow the contour of the pattern 9, the tracer resting on the surface of the pattern and rising and falling in accordance with the nature of this surface to rock the shaft 27 about the axis of the latter. Since both arms 16 and 17 are secured to the shaft 27, the cutter 24 will follow precisely the movements of the tracing element 23 and will cut a corresponding contour in the surface of the work blank 8. During this operation the necessary tension of the belt 50 will be maintained since the motor is secured to the shaft 27 and rocks therewith.

The motor 51 need not be secured directly to the shaft 27 but may be mounted on either of the arms 16 and 17 or on a separate arm secured to the shaft 27 and extending from the shaft in any convenient direction. It is found preferable, however, to support the motor at some point not too remote from the axis of the shaft 27 so that the center of gravity of the motor will be located adjacent the axis about which the unit swings as the tracer and cutter execute the necessary movements, since such a construction is found to improve the balance of the machine and to facilitate the execution of delicate tracing operations.

Preferably the balance of the moving parts of the machine may be adjusted so that the pressure applied to the tracer and the cutter to urge the same into engagement with the surfaces of the pattern and work blank respectively, may be readily controlled in accordance with the delicacy of operation desired. Any convenient means may be provided to urge the arms 16 and 17 downwardly or upwardly, as the case may be, to regulate this pressure in the event the balance of the moving parts of the machine is such as to require regulation. We prefer to employ balance weights which are replaceable or adjustable for this purpose. Thus in the construction shown in the drawings a generally U-shaped member 29 is illustrated as secured to the bosses 26 at the inner ends of the arms 16 and 17, the base of this U-shaped member being constructed to receive suitable balance weights 30 which are slotted as shown more particularly in Figure 3 for engagement with the member 29. We may also employ an upwardly directed bar 43, which is shown as carried by an arm 39 which is secured to the shaft 27 by set screw 40, the bar 43 being provided with a generally horizontal, forwardly directed portion at its upper end on which is received a weight member 44, the latter being adjustable along the bar 43 for the purpose of altering the balance of the moving parts of the machine and being secured in adjusted position on the bar in any convenient manner.

It will be observed that as the weight 44 is displaced forwardly, the downward pressure applied to the tracer and cutter is increased. Similarly the addition of weights 30 to the bar 29 serves to reduce the pressure applied to the tracer and cutter, and the necessary delicate balance may be readily secured. Various modifications of this balance arrangement will occur to one skilled in the art.

In order that the downward movement of the tracing and cutting elements and the arms 16 and 17 on which these elements are mounted may be limited, we may provide a stop screw 38 threaded in the arm 39 and provided with a knurled portion 41, this stop screw cooperating with an abutment 37 which is formed on or secured to the boss 33 on the stationary arm 32. It will be understood that by suitable adjustment of the stop screw 38, the downward movement of the tracer and cutter may be limited so as to avoid contact with the work table 4 when the work blank and pattern are removed.

It is an important feature of the invention that the axis about which the moving elements rock during operation of the machine is so chosen that the tracer and cutter will move in substantially vertical paths during the reproducing operation. The preferred arrangement is illustrated more particularly in Figures 3 and 4 of the drawings which show the axis of the shaft 27 as located substantially in the plane defined generally by the upper surfaces of the pattern 9 and work blank 8. Thus it will be seen from Figure 4 that with this arrangement the point of the tracer which engages the pattern will, in passing over the irregular surface of the pattern, rise and fall in the arc ee. In ordinary reproducing or engraving operations only a limited vertical movement of the tracer occurs, and it will be seen that during such limited movement the tracer moves in that portion of the arc ee which coincides substantially with the vertical line cc defining a normal to the surface of the pattern 9.

This arrangement is contrasted in Figure 5 with the conventional construction in which the axis of the shaft 27' on which the arm 16' is carried supports the tracer 23' for movement in an arc dd, this arm deviating materially from the normal cc to the surface of the pattern 9. It is, of course, highly desirable for accurate reproduction that the tracer and cutter be supported for movement as nearly as possible in directions perpendicular to the general plane defined by the surfaces with which they engage. The present construction approximates this desired condition, and without unnecessary complication of the supporting structure functions within practical limits to give the best results.

While the reproducing mechanism has been illustrated as applied to a milling machine and is most readily constructed as an attachment for a conventional metal working machine having a work support displaceable in two perpendicularly related horizontal directions, it is of course possible to practice the invention in connection with other types of metal working machines, for instance, a machine having a work table displaceable in a generally vertical plane. It is also obvious that in lieu of displacing a working table with respect to the cutter and tracer and the supporting parts therefor, the latter may be moved with respect to a stationary work table so as to cause the tracer and cutter to traverse the pattern and work blank.

It is possible to adjust the work table and the blank and pattern carried thereby to the proper position with respect to the tracer and cutter either by adjustment of the work table, as in the embodiment of the invention shown in the drawings in which the work table may be elevated by the threaded member 3, or to adjust the support for the reproducing mechanism with respect to the work table, the latter remaining stationary.

Such other alterations and modifications of the structure shown in the drawings are contemplated as fall within the spirit and scope of the appended claims.

We claim:

1. In an engraving or pattern reproducing machine, the combination with a work table serving as a support for a pattern and a blank, a tracing member supported for swinging movement about an axis parallel to the plane of said work table and provided with a tracing tool positioned to engage said pattern, means for effecting relative displacement of the work table and tracing member in two perpendicularly related directions in a single plane to effect traversal of said tracing member over said pattern, a cutting member rigid with said tracing member and provided with a cutting tool arranged to engage and traverse said blank, whereby the configuration of the pattern may be reproduced on the blank, and a motor carried by and swinging with said cutting and tracing members and operatively connected with said cutting tool to rotate the latter, said motor being disposed closely adjacent the axis of swinging movement of said members.

2. A pattern reproducing attachment for metal working machines of the type provided with a base and a work table displaceable on said base in two perpendicularly related directions in a substantially horizontal plane, a column extending upwardly from the base, and an overarm supported on said column, said attachment comprising a support constructed for mounting on said overarm, a tracing member pivoted on said support for swinging movement about a substantially horizontal axis into engagement with a pattern carried by said work table, a cutting member provided with a rotating cutting tool, said cutting member being operatively connected to said tracing member for swinging movement with the latter about the pivotal axis thereof to contact said tool with a blank carried by said work table, and means for rotating said cutting tool during such concurrent swinging movement of said tracing and cutting members, whereby on displacement of said work table the tracing and cutting members are caused to execute corresponding movements in accordance with variations in the depth of the pattern to reproduce the configuration of the pattern on the blank.

3. In an engraving or pattern reproducing machine, the combination with a base, of a work table supported by said base for displacement thereon in two perpendicularly related directions in a single plane, said work table serving as a support for a pattern and a blank, a tracing member pivoted on said base for swinging movement about an axis parallel to the plane of displacement of said work table and provided with a tracing tool positioned to engage and traverse said pattern as the work table is displaced in either direction, a cutting member rigid with said tracing member and provided with a cutting tool arranged to engage and traverse said blank as the work table is displaced in either direction, the axis of swinging movement of said members being disposed substantially in the plane defined by the surfaces of the pattern and blank, whereby inaccuracy of reproduction resulting from arcuate movement of the cutting and tracing tools is reduced to a minimum.

4. In an engraving or pattern reproducing machine, the combination with a base, of a work table supported by said base for displacement thereon in two perpendicularly related directions in a single plane, said work table serving as a support for a pattern and a blank, a tracing member pivoted on said base for swinging movement about an axis parallel to the plane of displacement of said work table and provided with a tracing tool positioned to engage and traverse said pattern as the work table is displaced in either direction, a cutting member rigid with said tracing member and provided with a cutting tool arranged to engage and traverse said blank as the work table is displaced in either direction, whereby the configuration of the pattern may be reproduced on the blank, and a motor carried by and swinging with said cutting and tracing members and operatively connected with said cutting tool to rotate the latter, said motor being disposed closely adjacent the axis of swinging movement of said members.

5. A pattern reproducing attachment for metal working machines of the type provided with a base and a work table displaceable on said base in two perpendicularly related directions in a substantially horizontal plane, a column extending upwardly from the base, and an overarm supported on said column, said attachment comprising a support constructed for mounting on said overarm, a tracing member pivoted on said support for swinging movement about a substantially horizontal axis into engagement with a pattern carried by said work table, a cutting member provided with a rotating cutting tool, said cutting member being operatively connected to said tracing member for swinging movement with the latter about the pivotal axis thereof to contact said tool with a blank carried by said work table, and means for rotating said cutting tool during such concurrent swinging movement of said tracing and cutting members, whereby on displacement of said work table the tracing and cutting members are caused to execute corresponding movements in accordance with variations in the depth of the pattern to reproduce the configuration of the pattern on the blank, said support including a collar dimensioned for reception on said overarm, and means for clamping the collar against axial displacement on the overarm.

ROBERT KREMER.
ROBERT CUMMINS.